United States Patent [19]
Asada et al.

[11] 3,917,777
[45] Nov. 4, 1975

[54] PROCESS FOR THE PREPARATION OF DRY SEMIPERMEABLE

[75] Inventors: Tsunesaburo Asada, Minoh; Fumiaki Komatsu, Nishinomiya; Hideo Tsuge, Takarazuka; Chota Yanagi, Kobe; Toshiyuki Kuwahara, Anagasaki, all of Japan

[73] Assignee: Kobe Steel, Ltd., Kobe, Japan

[22] Filed: Dec. 13, 1972

[21] Appl. No.: 314,599

[52] U.S. Cl.............. 264/41; 210/500 M; 264/216; 264/218
[51] Int. Cl.².................... B29D 27/04; B29D 7/14
[58] Field of Search............. 264/217, 218, 216, 41, 264/49; 210/500 M

[56] References Cited
UNITED STATES PATENTS

| | | | |
|---|---|---|---|
| 3,607,329 | 9/1971 | Manjikian | 264/217 |
| 3,666,508 | 5/1972 | Justice et al. | 264/217 |
| R27,280 | 2/1972 | Manjikian | 264/331 |

*Primary Examiner*—Robert F. White
*Assistant Examiner*—Gene Auville
*Attorney, Agent, or Firm*—Oblon, Fisher, Spivak, McClelland & Maier

[57] ABSTRACT

A dry semipermeable membrane, which is adapted to separate solutes from solutions by reverse osmosis methods, is prepared by a process which comprises casting a film from a casting solution containing a cellulose derivative, a first additive, and a suitable amount of an organic compound with an organic solvent as the balance of the casting solution; evaporating a portion of said organic solvent from said cast film; dipping the partially evaporated film in water to extract the remainder of said organic solvent and drying the extracted film.

7 Claims, No Drawings

PROCESS FOR THE PREPARATION OF DRY SEMIPERMEABLE

BACKGROUND OF THE INVENTION

1. Field of the Invention

This invention relates to a process for the preparation of semipermeable membranes. More particularly, the invention relates to a process for the preparation of semipermeable membranes which are adapted to separate solutes from solvents from various solutions, and are especially adapted to demineralize saline waters by reverse osmosis. More especially, the invention relates to a process for the preparation of dry semipermeable membranes.

2. Description of the Prior Art

The so-called Loeb-type membranes are well known semipermeable membranes which are adapted for the separation of solutes from solvents from various solutions, especially the demineralization of saline waters. As disclosed in Japanese Pat. Publication No. 2818/67, such conventional membranes are prepared by a method which comprises casting a solution containing a cellulose derivative, a substantially water-soluble liquid amide and, optionally, an organic solvent to form a film. A portion of the organic solvent is evaporated from the film, and then the film is dipped in water. Finally, the film is heated to reduce the porosity thereof. The reference discloses that in the preparation of a membrane from a cellulose derivative and a liquid amide from a casting solution, the ratio of the liquid amide to the cellulose derivative is adjusted within a range of from about 2 : 1 to about 4 : 1, preferably 3 : 1, and that when both a liquid amide and an organic solvent are used together with the cellulose derivative, the concentration of the cellulose derivative in the casting solution is adjusted to about 20 to about 30 percent by weight and the concentration of the liquid amide is adjusted from about 10 to about 40 percent by weight.

Although semipermeable membranes prepared by such conventional methods have sufficient properties which renders them applicable for practical use, these membranes are obtained in a water-containing, hydrous state because of the composition of the casting solution and the special film-manufacturing steps. When the films are to be used as reverse osmosis membranes, they should be stored and used under conditions which enable the membranes to remain wet with water. Further, the fact that the membranes are in a water-containing hydrous state means that storage, transportation and handling of these membranes involves various operational troubles and maintenance controls. In the instance where the Loeb-type membranes are used in a completely dried state, the amount of flow of the permeated solvent is drastically lowered and the capacities of the semipermeable membranes are greatly diminished. In other words, these conventional semipermeable membranes are water-containing membranes, and because of their hydrous properties they pass large amounts of solvent when maintained and used under moist conditions. Accordingly, if they are maintained under dry conditions prior to use, e.g., during the film-manufacturing steps or during storage, their applicability is lost. If the membranes are intended to be used under dry conditions, special properties must be imparted to the membranes by treatment with a surface active agent or a freeze-drying treatment such as disclosed in U.S. Pat. No. 3,428,584.

A need therefore exists for semipermeable membranes which do not have to be constantly maintained and used under hydrous conditions in order to function properly.

SUMMARY OF THE INVENTION

Accordingly, an object of this invention is to provide a process for the preparation of improved semipermeable membranes useful under dry conditions which overcome the disadvantages involved in the storage, transportation and handling of conventional, Loeb-type semipermeable membranes because of their hydrous characteristics.

Briefly, this object and other objects of this invention, as hereinafter will become apparent, are achieved in a process for the preparation of semipermeable membranes which comprises casting a film from a solution which comprises 7 to 15 percent by weight, preferably 9 to 13 percent by weight, of a cellulose derivative having a viscosity of 20 to 100 seconds as measured by the ASTM D-1343-56 and D-871-63 methods, water or a substantially water-soluble alcohol inclusive of polyhydric alcohols wherein the weight ratio of water or the alcohol to the cellulose derivative ranges from 1 : 20 to 3 : 1, preferably from 1 : 10 to 2 : 1, and a substantially water-soluble additive capable of hydrogen bond formation with the balance of the casting solution being an organic solvent. After evaporating a portion of the organic solvent from the cast film, the film is dipped into water to extract the remaining organic solvent and other soluble residues. Finally, the film is dried directly or by a heat treatment by dipping the film into hot water.

DESCRIPTION OF THE PREFERRED EMBODIMENTS

The components which constitute the casting solution of this invention will now be described. The first component is a cellulose derivative expressed by the following general formula:

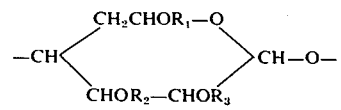

and is selected from those derivatives which have a viscosity of 20 to 100 seconds as measured by the ASTM-D-1343-56 and D-871-63 methods. In the film forming solution of this invention, the concentration of the cellulose derivative is within the range of from 7 to 15 percent by weight, which is much lower than the concentrations of conventional casting solutions. In order to form semi-permeable membranes from solutions having such a low cellulose derivative concentration, compensation should be made by using high molecular weight cellulose derivatives. Otherwise, a membrane of good quality cannot be obtained. For this reason, the viscosity, which is one index of molecular weight, is limited in this invention within the above-indicated range.

The second component is selected from the group consisting of water and substantially water-soluble alcohols inclusive of polyhydric alcohols.

The third component includes organic solvents such as acetone, dioxane and methyl acetate. According to various experiments, acetone has been confirmed to be a particularly good solvent.

A polar organic compound is used as the fourth component, and it is a substantially water-soluble additive. It is essential that such compounds should possess active hydrogen atoms capable of hydrogen bond formation. Suitable examples of these compounds include hydroxy acids, carboxylic acids, alcohols, aldehydes, acid imides, phosphoric acid esters, carbamides, cyclic acid amides, acid amides, and the like. In addition to these organic compounds, inorganic compounds such as hydrogen peroxide, ammonium sulfate, phosphoric acid, and the like may also be used effectively.

In the composition of this invention, suitable amounts of the cellulose derivatives fall within the range of from 7 to 15 percent by weight, preferably from 9 to 13 percent by weight. One of the features of the process of this invention resides in that the weight ratio of the cellulose derivative is much lower than the weight ratios of the casting solutions used in the preparation of conventional, Loeb-type semipermeable membranes. More specifically, it is possible to prepare dry, semipermeable membranes without degradation of the membranes characteristics, only when the content of the cellulose derivative in the casting solution is 15% by weight or less. In order to prepare a semipermeable membrane from a casting solution containing a cellulose derivative at such a low content, the viscosity of the cellulose derivative must be within a range of from 20 to 100 seconds as measured by the ASTM D-1343-56 and D-871-63 methods. In the instances where the content of the cellulose derivative is less than 7 percent by weight, the casting cannot be conducted smoothly. Thus, the lower limit of the cellulose derivative content is 7 percent by weight.

The second component of the casting solution is an optional component. Semipermeable membranes of good quality can be obtained without incorporation of this component. However, when a membrane cast from a film-forming solution free of the second component is dried, extreme degradation of the membrane characteristics results and a dry semipermeable membrane cannot be obtained. In order to obtain a semipermeable membrane which exhibits excellent properties even in the dried state, the second component should preferably be incorporated in the film forming solution in an amount wherein the weight ratio of the second component to the cellulose derivative is within the range of from 1 : 20 to 3 : 1, especially from 1 : 10 to 2 : 1.

As is apparent from the foregoing, in order to obtain a dry semipermeable membrane in which the drying step of the process does not cause extreme degradation of the membrane properties, it is essential that the weight ratio of the cellulose derivative in the film forming solution should be much lower than in conventional film forming solutions, and water or a water-soluble alcohol should be incorporated in the film-forming solution. Thus, a membrane with a sufficiently porous structure can be formed by the process of this invention.

A variety of compounds can be used as the fourth component, and suitable amounts of the fourth component should not be greater than 40 percent by weight. The development of the porous structure in the membrane by the second component can be controlled by appropriately varying the amount and kind of the fourth component. When the fourth component is judiciously selected, a membrane which possesses a uniform porous structure can be obtained. This additive, as well as water, contributes to the increase of the amount of flow of the permeating solvents through the resulting semipermeable membrane. However, if the fourth component is incorporated in the solution in amounts exceeding 40 percent by weight, the capacity of the resulting membrane to remove salts and other solutes is drastically curtailed. For this reason, the upper limit of the fourth component is 40 percent by weight. However, it is not absolutely necessary to incorporate the fourth component in the casting solution.

The amounts of the third component incorporated in the solution are optional relative to the content of the other three components in their specified ranges.

The functions of the additives have not been completely elucidated theoretically, but experimental results have confirmed that when the first additive such as water or alcohols containing OH functional groups is incorporated in the casting solution, semipermeable membranes may be obtained which allow considerable amounts of solvents to permeate therethrough, even when in a dry state.

It is considered that water or an alcohol acts on the OH-groups of the cellulose derivative in such a way as to form large blocks, which result in the formation of large pores within the membrane. Thus, when the membrane is dried, a relatively high degree of water-permeability can be obtained. In contrast, in the absence of water or an alcohol, compounds such as formamide or lactic acid act on the acetyl groups of the cellulose acetate derivative and, since this action is uniform, only small pores are formed. Therefore, when the membrane is dried, its water-permeability is reduced.

The use of water or an alcohol in the casting solution offers the additional advantage of a short period of time for gelation of the cast solution during the dipping step. This advantage aids in the formation of large pores.

The actual procedures for the manufacture of semipermeable membranes will now be illustrated.

The casting solution of this invention having a composition as defined above is cast into a film of a certain thickness (70 to 200$\mu$) on a glass sheet. Then, a portion of the organic solvent is evaporated from the cast film over a certain period of time. At this point, the evaporation time varies depending on the environmental temperature, but it is generally from about 10 seconds to about 15 minutes. In the instance where the evaporation is effected at room temperature (20°C.), the evaporation time is about 15 seconds to 1.5 minutes. After partial evaporation of the solvent, the film is dipped in water until the organic solvent is sufficiently extracted. The treated film is removed from the water, and then dried sufficiently in air or in a drier. In this case, it is permissible to subject the film to a heat treatment in hot water prior to the drying step.

The membrane obtained by the process of this invention, unlike the conventional Loeb type water-containing membranes, can be used directly even in the dry state. Further, excessive water contained in the membrane prior to the drying step can be effectively removed by the drying treatment, and therefore, the permaselective characteristics (for instance, the desalination capacity) of the membrane can be highly improved.

Having generally described the invention, a further understanding can be obtained by reference to certain specific Examples which are provided herein for purposes of illustration only and are not intended to be limiting unless otherwise specified.

EXAMPLE 1

A casting solution containing 11 percent by weight cellulose acetate, 68 percent by weight acetone, 10 percent by weight water and 11 percent by weight lactic acid was prepared, and was cast onto a glass sheet in a thickness of 0.2 mm. The preparation of the casting solution and the casting thereof were conducted at room temperature. For a period of about 45 seconds, as measured from the initiation of the casting operation, acetone was evaporated at room temperature. Then, the cast film together with the glass sheet was dipped in ice water maintained at a temperature of from 1° to 2°C. for about 1 hour. The resulting film was heated at 80°C. for about 5 minutes, and then placed on a porous supporting plate. The film was subjected to a permeation test wherein an aqueous solution containing 0.5 percent sodium chloride was placed on the film and passed therethrough under a pressure of 50 Kg/cm$^2$. The amount of water which permeated was 2.07 cc per square centimeter of the membrane surface area per hour. The salt concentration in the permeated water was 148 ppm.

The viscosity of the cellulose acetate derivatives used in this Example was 40 to 50 seconds as measured by the ASTM D-1343-56 and D-871-63 methods.

EXAMPLE 2

Semipermeable membranes were prepared from the casting solutions and conditions indicated in Table I according to the method described in Example 1. A permeation test was performed on each membrane prepared according to the procedure described in Example 1. Results of these tests are shown in Table I.

From the description of this invention, it will be readily understood that the process of this invention is excellent for the preparation of dry semipermeable membranes which can be used directly for the separation of solutes from solvents, especially for the desalination of sea water by a reverse osmosis procedure.

Having now fully described the invention, it will be apparent to one of ordinary skill in the art that many changes and modifications can be made thereto without departing from the spirit or scope of the invention as set forth herein. Accordingly,

What is claimed as new and intended to be covered by letter patent is:

1. A process for the preparation of dry semipermeable membranes, which comprises:

casting a film from a casting solution consisting essentially of 9 to 13 percent by weight of a cellulose derivative having a viscosity of 20 to 100 seconds as measured by the ASTMD-1343-56 and D-871-63 methods, water or water-soluble alcohol wherein the weight ratio of the water or water soluble alcohol to said cellulose derivative being within a range of from 1:20 to 3:1, and a polar, substantially water soluble organic compound selected from the group consisting of acid amides, carbamides, acid imides, aldehydes, carboxylic acids, hydroxy acids and phosphoric acid esters with an organic solvent as the balance of the casting solution:

evaporating a portion of the organic solvent from said cast film;

dipping the partially evaporated film in water to extract the remainder of said organic solvent; and drying the extracted film in air.

2. The process of claim 1, wherein said cellulose derivative is selected from the group consisting of cellulose acetate, cellulose-acetate-butyrate, cellulose propionate and ethyl cellulose.

3. The process of claim 1, wherein said organic solvent is selected from the group consisting of acetone, dioxane and methyl acetate.

4. The process of claim 1, wherein said extracted film is directly dried in heated air.

5. The process of claim 1, wherein said extracted film is treated with hot water and then dried.

6. The process of claim 1, wherein the weight ratio of the water soluble alcohol to said cellulose derivative is within the range of 1 : 10 to 2 : 1.

7. The process of claim 1, wherein said water soluble alcohol is a polyhydric alcohol.

TABLE I

| Composition of casting Solution (% by weight) | | | | Evaporation Time | casting | Heat Treatment | Water Permeation | |
|---|---|---|---|---|---|---|---|---|
| Solvent | Cellulose Acetate | First Additive | Second Additive | (sec.) | Temperature (°C.) | Temperature (°C.) | Flow Amount (cc/cm$^2$/hr) | Salt Concentration (ppm) |
| 74 (acetone) | 10 | 10 (water) | 6 (acetamide) | 30 | 10 | — | 2.09 | 340 |
| 74 (acetone) | 10 | 10 (water) | 6 (urea) | 30 | 23 | — | 1.87 | 930 |
| 73 (acetone) | 15 | 10 (water) | 2 (ammonium sulfate) | 120 | 0 | — | 0.20 | 550 |
| 72 (acetone) | 11 | 3 (water) | 14 (formamide) | 45 | 22 | 80 | 2.17 | 210 |
| 69 (acetone) | 11 | 10 (water) | 10 (succinic imide) | 45 | 20 | 80 | 1.03 | 250 |
| 74 (dioxane) | 10 | 10 (water) | 6 (acetamide) | 60 | 23 | — | 15.24 | 4,500 |
| 69 (acetone) | 11 | 10 (water) | 10 (caprolactam) | 45 | 20 | 80 | 3.40 | 300 |
| 66 (acetone) | 11 | 10 (water) | 13 (pyrrolidone) | 45 | 22 | 80 | 1.26 | 250 |
| 86.5 (acetone) | 11 | 3 (glycerine) | 5.5 (formamide) | 40 | 20 | 80 | 1.72 | 700 |
| 75 (acetone) | 11 | 8 (ethylene glycol) | 6 (formamide) | 40 | 20 | 80 | 4.73 | 2,900 |

* * * * *

UNITED STATES PATENT AND TRADEMARK OFFICE
CERTIFICATE OF CORRECTION

PATENT NO. : 3,917,777
DATED : November 4, 1975
INVENTOR(S) : Tsunesaburo Asada, Fumiaki Komatsu, Hideo Tsuge, Chota Yanagi, and Toshiyuki Kuwahara It is certified that error appears in the above-identified patent and that said Letters Patent are hereby corrected as shown below:

Change Title from "Process for the Preparation of Dry Semipermeable" to --Process for the Preparation of Dry Semipermeable Membranes--.

Signed and Sealed this ninth Day of March 1976

[SEAL]

Attest:

RUTH C. MASON
*Attesting Officer*

C. MARSHALL DANN
*Commissioner of Patents and Trademarks*